(12) United States Patent
Li et al.

(10) Patent No.: US 12,462,543 B2
(45) Date of Patent: Nov. 4, 2025

(54) TRAINING METHOD AND APPARATUS OF ADVERSARIAL ATTACK MODEL, GENERATING METHOD AND APPARATUS OF ADVERSARIAL IMAGE, ELECTRONIC DEVICE, AND STORAGE MEDIUM

(71) Applicant: Tencent Technology (Shenzhen) Company Limited, Guangdong (CN)

(72) Inventors: Jiachen Li, Guangdong (CN); Baoyuan Wu, Guangdong (CN); Yong Zhang, Guangdong (CN); Yanbo Fan, Guangdong (CN); Zhifeng Li, Guangdong (CN); Wei Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 406 days.

(21) Appl. No.: 17/690,797

(22) Filed: Mar. 9, 2022

(65) Prior Publication Data
US 2022/0198790 A1    Jun. 23, 2022

Related U.S. Application Data

(63) Continuation of application No. PCT/CN2020/128009, filed on Nov. 11, 2020.

(30) Foreign Application Priority Data

Feb. 21, 2020  (CN) .......................... 202010107342.9

(51) Int. Cl.
G06V 10/778    (2022.01)
G06V 10/24     (2022.01)
(Continued)

(52) U.S. Cl.
CPC .............. G06V 10/82 (2022.01); G06V 10/24 (2022.01); G06V 10/28 (2022.01); G06V 10/776 (2022.01);
(Continued)

(58) Field of Classification Search
CPC ........ G06V 10/82; G06V 10/24; G06V 10/28; G06V 10/776; G06V 10/778;
(Continued)

(56) References Cited

U.S. PATENT DOCUMENTS

2004/0101160 A1\* 5/2004 Kunisa .................. G06T 1/0028
382/100
2016/0307071 A1\* 10/2016 Perronnin ............. G06F 18/214
(Continued)

FOREIGN PATENT DOCUMENTS

CN    108510061 A    9/2018
CN    109196526 A    1/2019
(Continued)

OTHER PUBLICATIONS

Athalye, Anish, et al. "Synthesizing robust adversarial examples." International conference on machine learning. PMLR, 2018.
(Continued)

*Primary Examiner* — Huo Long Chen
(74) *Attorney, Agent, or Firm* — ArentFox Schiff LLP

(57) ABSTRACT

Aspects of the disclosure are directed to a training method and apparatus of an adversarial attack model, a generating method and apparatus of an adversarial image, an electronic device, and a storage medium. The adversarial attack model can include a generator network, and the training method can include using the generator network to generate an adversarial attack image based on a training digital image, and performing an adversarial attack on a target model based on the adversarial attack image, to obtain an adversarial
(Continued)

attack result. The training method can further include obtaining a physical image corresponding to the training digital image, and training the generator network based on the training digital image, the adversarial attack image, the adversarial attack result, and the physical image.

18 Claims, 8 Drawing Sheets

(51) Int. Cl.
*G06V 10/28* (2022.01)
*G06V 10/776* (2022.01)
*G06V 10/82* (2022.01)
*H04L 9/40* (2022.01)

(52) U.S. Cl.
CPC ........ *G06V 10/778* (2022.01); *G06V 2201/07* (2022.01); *H04L 63/1433* (2013.01)

(58) Field of Classification Search
CPC ............... G06V 2201/07; G06V 10/77; H04L 63/1433; H04L 63/1416; G06N 3/08; G06N 20/00; G06F 21/566
See application file for complete search history.

(56) References Cited

U.S. PATENT DOCUMENTS

| | | | |
|---|---|---|---|
| 2017/0351935 | A1 | 12/2017 | Liu et al. |
| 2019/0130253 | A1* | 5/2019 | Schultz ............... A41D 1/02 |
| 2019/0147320 | A1* | 5/2019 | Mattyus ............ G06V 20/182 382/155 |
| 2019/0220755 | A1* | 7/2019 | Carbune ............. G06N 20/00 |
| 2019/0238568 | A1* | 8/2019 | Goswami ........... G06F 21/566 |
| 2020/0082097 | A1* | 3/2020 | Poliakov ............ G06F 21/577 |
| 2020/0265318 | A1* | 8/2020 | Malkiel .............. G06N 3/047 |
| 2021/0398289 | A1* | 12/2021 | Schmidt .............. G06N 3/045 |

FOREIGN PATENT DOCUMENTS

| | | | |
|---|---|---|---|
| CN | 109447263 | A | 3/2019 |
| CN | 109801221 | A | 5/2019 |
| CN | 110163093 | A | 8/2019 |
| CN | 110210573 | A | 9/2019 |
| CN | 110334806 | A * | 10/2019 |
| CN | 110352430 | A | 10/2019 |
| CN | 110443203 | A | 11/2019 |
| CN | 110728629 | A | 1/2020 |
| CN | 111340214 | A | 6/2020 |

OTHER PUBLICATIONS

Eykholt, Kevin, et al. "Robust physical-world attacks on deep learning visual classification." Proceedings of the IEEE conference on computer vision and pattern recognition. 2018.
Jan, Steve TK, et al. "Connecting the digital and physical world: Improving the robustness of adversarial attacks." Proceedings of the AAAI Conference on Artificial Intelligence. vol. 33. No. 01. 2019.
Goodfellow, Ian, et al. "Generative adversarial nets." Advances in neural information processing systems 27 (2014).
Deng, Jia, et al. "Imagenet: A large-scale hierarchical image database." 2009 IEEE conference on computer vision and pattern recognition. Ieee, 2009.
Simonyan, Karen, and Andrew Zisserman. "Very deep convolutional networks for large-scale image recognition." arXiv preprint arXiv:1409.1556 (2014).
Madry, Aleksander, et al. "Towards deep learning models resistant to adversarial attacks." arXiv preprint arXiv:1706.06083 (2017).
International Search Report and Written Opinion issued Jan. 27, 2021 in International Application. No. PCT/CN2020/128009 with English translation. 10 pgs.
Chinese Office Action issued Oct. 20, 2020 in Chinese Application No. 202010107342.9 with English translation, 11 pgs.
Chinese Office Action Issued Mar. 24, 2021 in Chinese Application No. 202010107342.9 with English translation; 5 pgs.
Jiachen Li, et al., Interaction-aware Multi-agent Tracking and Probabilistic Behavior Prediction via Adversarial Learning, 2019 International Conference on Robotics and Automation (ICRA), Palais-des congres de Montreal, Montreal, Canada, May 20-24, 2019, 7 pgs.
Yonghao Xu, Can We generate Good Samples Hyperspectral Classification? A Generative Adversarial Network Based Method, International Geoscience and Remote Sensing Symposium 4 pgs.
Yinan Yang, et al., Research on Generation Technology of Small Sample Data Based on Generative Adversarial Network, Electric Power Construction, vol. 40, No. 5, May 2019, 7 pgs.

* cited by examiner

TRAINING METHOD AND APPARATUS OF ADVERSARIAL ATTACK MODEL, GENERATING METHOD AND APPARATUS OF ADVERSARIAL IMAGE, ELECTRONIC DEVICE, AND STORAGE MEDIUM

RELATED APPLICATION

This application is a continuation of International Application No. PCT/CN2020/128009, filed on Nov. 11, 2020, which claims priority to Chinese Patent Application No. 202010107342.9, entitled "TRAINING METHOD AND APPARATUS OF ADVERSARIAL ATTACK MODEL" filed on Feb. 21, 2020. The entire disclosures of the prior applications are hereby incorporated by reference in their entirety

FIELD OF THE TECHNOLOGY

The present disclosure relates to the field of artificial intelligence technologies, including a training method and apparatus of an adversarial attack model, a generating method and apparatus of an adversarial image, an electronic device, and a storage medium.

BACKGROUND OF THE DISCLOSURE

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science that attempts to understand the essence of intelligence and produce a new intelligent machine that can react in a manner similar to human intelligence. AI can include the study of design principles and implementation methods of various intelligent machines, to enable the machines to have functions of perception, reasoning, and decision-making.

As the AI technology advances, it has been applied in a variety of fields, such as smart home, smart wearable devices, virtual assistants, smart speakers, smart marketing, unmanned driving, autonomous driving, drones, robots, smart medical, smart customer service, and the like.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions, such as a computer vision (CV) technology, a natural language processing technology, and machine learning/deep learning.

Machine learning specializes in studying how a computer simulates or implements a human learning behavior to obtain new knowledge or skills, and reorganize an existing knowledge structure, so as to keep improving its performance. The machine learning is the core of the AI, as well as a basic way to make the computer intelligent and applied to various fields of AI. Currently, various forms of machine learning models have completely changed many fields of the AI. For example, a machine learning model trained by using a deep neural network (DNN) is used for processing machine vision tasks.

Although the DNN performs well, it is extremely vulnerable to an adversarial attack. The adversarial attack is manifested as a tiny perturbation of artificial computation added by an attacker to an input of the DNN, in order to cause the DNN to generate an incorrect output, for example, by deceiving the DNN. Due to the vulnerability to the attack performed by adversarial samples, the DNN needs to improve its defense capability so as to reduce a possibility of being deceived by the adversarial attack samples.

SUMMARY

According to an aspect, the present disclosure provides a training method of an adversarial attack model including a generator network. The training method can include using the generator network to generate an adversarial attack image based on a training digital image, and performing an adversarial attack on a target model based on the adversarial attack image to obtain an adversarial attack result. The training method can further include obtaining a physical image corresponding to the training digital image, and training the generator network based on the training digital image, the adversarial attack image, the adversarial attack result, and the physical image.

In other embodiments of the training method performing an adversarial attack further include performing geometric transformation on the adversarial attack image to obtain an adversarial attack image after the geometric transformation, and performing the adversarial attack on the target model by using the adversarial attack image after the geometric transformation to obtain the adversarial attack result.

In further aspects of the disclosure, the adversarial attack model further includes a discriminator network, and training the generator network further includes obtaining a target label corresponding to the training digital image, determining an adversarial attack loss based on the target label and the adversarial attack result, and training the generator network based on the adversarial attack loss, using the discriminator network to perform image discrimination based on the adversarial attack image and the physical image to determine a discrimination loss, and jointly training the generator network and the discriminator network based on the adversarial attack loss and the discrimination loss.

Another embodiment of the disclosure provides a training apparatus of an adversarial attack model that includes a generator network. The training apparatus can include a generating device that is configured to use the generator network to generate an adversarial attack image based on a training digital image, and an attack device that is configured to perform an adversarial attack on a target model based on the adversarial attack image to obtain an adversarial attack result. The training apparatus can further include an obtaining device that is configured to obtain a physical image corresponding to the training digital image, and a training device that is configured to train the generator network based on the training digital image, the adversarial attack image, the adversarial attack result, and the physical image.

Other aspects of the disclosure are directed to a generating apparatus of an adversarial image comprising processing circuitry that is configured to train an adversarial attack model including a generator network to obtain a trained adversarial attack model, and use the trained adversarial attack model to generate the adversarial image based on an inputted digital image. Training an adversarial attack model can include using the generator network to generate an adversarial attack image based on a training digital image, performing an adversarial attack on a target model based on the adversarial attack image to obtain an adversarial attack result, obtaining a physical image corresponding to the training digital image, and training the generator network based on the training digital image, the adversarial attack image, the adversarial attack result, and the physical image.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

Figure 1:
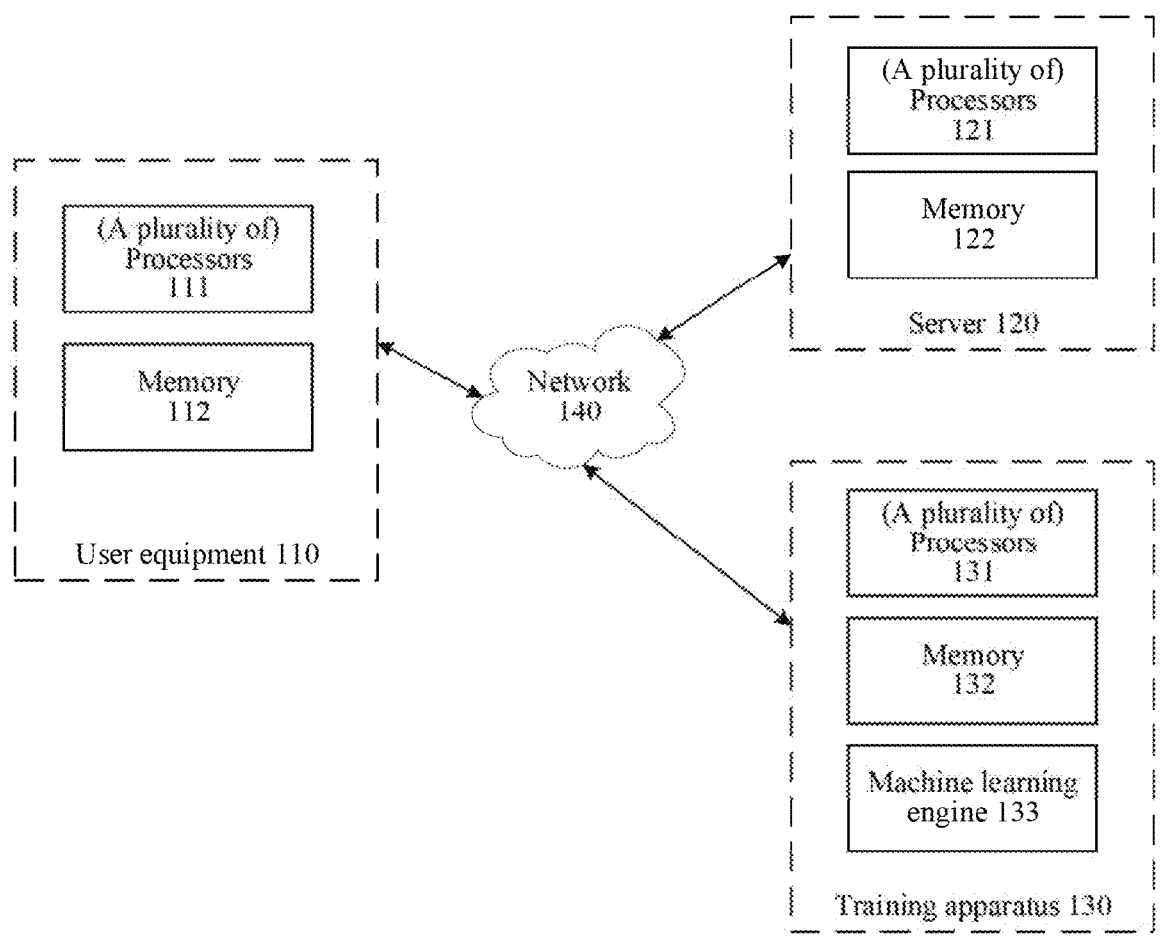
FIG. 1 shows a block diagram of an exemplary system to which training of an adversarial attack model according to an embodiment of the present disclosure may be applied.

To make the objectives, technical solutions, and advantages of the embodiments of the present disclosure more comprehensible, the following clearly and completely describes the technical solutions in the exemplary embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure shall fall within the protection scope of the present disclosure.

The terms used herein to describe the embodiments of the present disclosure are not intended to limit and/or limit the scope of the present disclosure. For example, unless otherwise defined, the technical terms or scientific terms used in the present disclosure shall have general meanings understood by a person of ordinary skill in the field of the present disclosure.

It is to be understood that, the "first", the "second", and similar terms used in the present disclosure do not indicate any order, quantity or significance, but are used to only distinguish different components. Unless the context clearly dictates otherwise, singular forms "a", "an" or "the" and similar terms do not denote a limitation of quantity, but rather denote the presence of at least one.

It is further understood that "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect. "Up", "down", "left", "right", and the like are merely used for indicating relative positional relationships. When absolute positions of described objects change, the relative positional relationships may correspondingly change.

The following embodiments of the present disclosure are described in detail with reference to the accompanying drawings. The same reference number in different drawings refers to the same element that has already been described.

An adversarial attack, depending on different domains in which it works, is generally divided into two types: a digital adversarial attack and a physical adversarial attack. The digital adversarial attack is a way of directly inputting a digital adversarial sample, such as a digital image in a digital world, including a digital domain or a digital space, into the DNN for an attack. The physical adversarial attack is a way of using a physical adversarial sample in a physical world, including a physical domain or a physical space, to attack the DNN.

A difficulty of the physical adversarial attack lies in that an adversarial sample, for example an adversarial image, effective in the digital domain usually loses its attack effect due to image distortion after a conversion from the digital domain to the physical domain. In addition, there may exist a high uncertainty during the conversion from the digital domain to the physical domain, hence, it is difficult to accurately model.

In order to solve at least the above problems, the exemplary embodiments of the present disclosure provide an adversarial attack model used for an adversarial attack, a training method of the adversarial attack model, a generating method of an adversarial sample, for example an adversarial image, by using the adversarial attack model, and a training method of a target model by using the adversarial sample.

FIG. 1 shows a block diagram of an exemplary system 10 to which training of an adversarial attack model according to an embodiment of the present disclosure may be applied. Referring to FIG. 1, the system 10 may include a user equipment 110, a server 120, and a training apparatus 130. As shown, the user equipment 110, the server 120, and the training apparatus 130 may be communicatively coupled to each other through a network 140.

The user equipment 110 may be any type of electronic device, such as a personal computer (e.g., a laptop or a desktop computer), a mobile device (e.g., a smart phone or a tablet), a game console, a wearable device, and the like. The user equipment 110 may include one or more processors 111 and a memory 112. The one or more processors 111 each may be any suitable processing device, such as a processor core, a microprocessor, an application specific integrated circuit (ASIC), a field programmable gate array (FPGA), a controller, a microcontroller, and the like. In addition, the processing device may be one processor or a plurality of processors that are operably connected. The memory 112 may include one or more non-transitory computer-readable storage mediums, such as a random-access memory (RAM), a read-only memory (ROM), an electrically erasable programmable ROM (EEPROM), an electrical programmable ROM (EPROM), a flash memory device, a magnetic disk, etc., and combinations thereof. The memory 112 may store data and non-transitory instructions executed by the processor 111 to cause the user equipment 110 to perform operations.

In some embodiments, the user equipment 110 may store or include one or more adversarial attack models. In some embodiments, the user equipment 110 may also store or otherwise include one or more target models. In an embodiment of the present disclosure, a target model may refer to a model to be attacked. For example, the target model may be or otherwise include various machine learning models, such as a neural network (e.g., the DNN) or other types of machine learning models, including non-linear models and/or linear models. Neural networks can include feed-forward neural networks, recurrent neural networks (e.g., long short-term memory recurrent neural networks), convolutional neural networks, or other forms of neural networks.

In some embodiments, the one or more adversarial attack models may be received from the server 120 through the network 140, and stored in the memory 114 of the user equipment. Then, the one or more adversarial attack models are used or otherwise implemented by the one or more processors 111.

In some embodiments, the server 120 may include the one or more adversarial attack models. The server 120 communicates with the user equipment 110 according to a client-server relationship. For example, an adversarial attack model may be implemented by the server 140 as part of a web service. Therefore, the one or more adversarial attack models may be stored and implemented at the user equipment 110 and/or the one or more adversarial attack models may be stored and implemented at the server 120.

In some embodiments, the server 120 includes one or more processors 121 and a memory 122. The one or more processors 121 each may be any suitable processing device, such as a processor core, a microprocessor, an ASIC, an FPGA, a controller, a microcontroller, and the like. In addition, the processing device may be one processor or a plurality of processors that are operably connected. The memory 122 may include one or more non-transitory computer-readable storage mediums, such as a RAM, a ROM, an EEPROM, an EPROM, a flash memory device, a magnetic disk, and the like or combinations thereof. The memory 122 may store data and instructions executed by the processor 121 to cause the server 120 to perform operations.

In some embodiments, the server 120 may also store or otherwise include one or more target models. In an embodiment of the present disclosure, a target model may refer to a model to be attacked. For example, the target model may be or otherwise include various machine learning models, such as a neural network (e.g., the DNN) or other types of machine learning models including non-linear models and/or linear models. Neural networks can include feed-forward neural networks, recurrent neural networks (e.g., long short-term memory recurrent neural networks), convolutional neural networks or other forms of neural networks.

In some embodiments, the user equipment 110 and/or the server 120 may train the adversarial attack model(s) and/or the target model(s) through interactions with the training apparatus 130 communicatively coupled via the network 140. In some embodiments, the training apparatus 130 may be separate from the server 120 or may be a part of the server 120.

In some embodiments, the training apparatus 130 includes one or more processors 131 and a memory 132. The one or more processors 131 each may be any suitable processing device, such as a processor core, a microprocessor, an ASIC, an FPGA, a controller, a microcontroller, and the like. In addition, the processing device may be one processor or a plurality of processors that are operably connected. The memory 132 may include one or more non-transitory computer-readable storage mediums, such as a RAM, a ROM, an EEPROM, an EPROM, a flash memory device, a magnetic disk, and the like or combinations thereof. The memory 132 may store data and instructions executed by the processor 131 to cause the training apparatus 130 to perform operations.

In some embodiments, the training apparatus 130 may include a machine learning engine 133. For example, the machine learning engine 133 may train the adversarial attack model(s) and/or the target model(s) stored at the user equipment 110 and/or the server 120 by using various training techniques or learning techniques. The machine learning engine 133 may use various techniques (e.g., weight decay, loss, etc.), to improve generalization ability of the model(s) being trained. The machine learning engine 133 may include one or more machine learning platforms, frameworks, and/or libraries, such as TensorFlow, Caffe/Caffe2, Theano, Torch/PyTorch, MXnet, CNTK, and the like. Further, in some embodiments, the machine learning engine 133 may implement the training of the adversarial attack model(s) and/or the target model(s).

As mentioned above, FIG. 1 shows the exemplary system that may be used to implement the present disclosure. However, the present disclosure is not limited to this system, and may also use other systems to implement the present disclosure. For example, in some embodiments, the user equipment 110 may include a machine learning engine and a training dataset. In such embodiments, the adversarial attack model(s) and/or the target model(s) may be trained and used at the user equipment 110, or an adversarial sample may be generated by using a trained adversarial attack model.

Figure 2A:
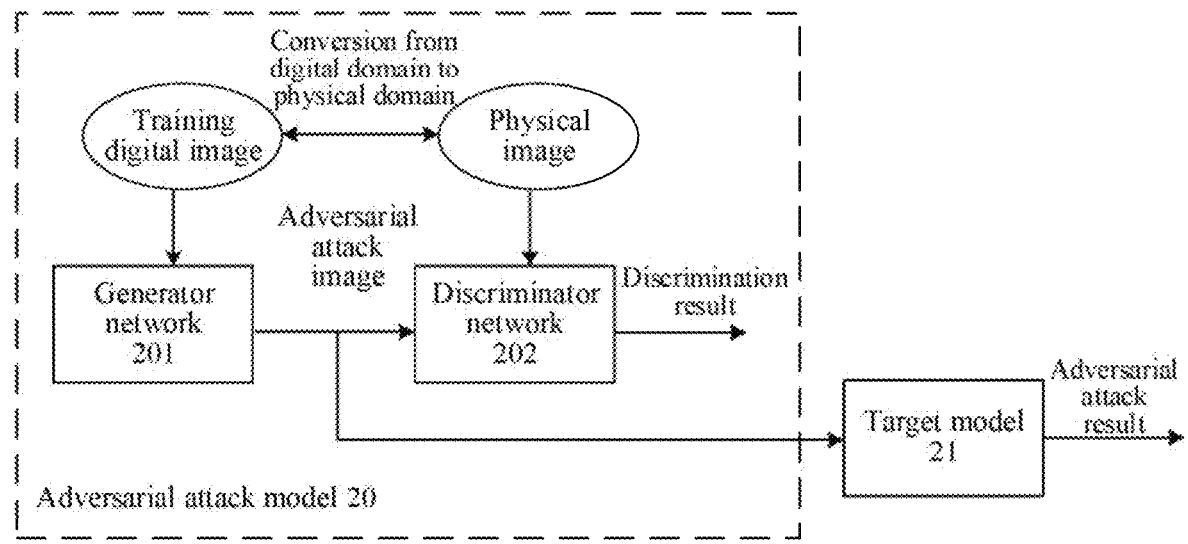
FIG. 2A shows an exemplary block diagram of an adversarial attack model according to some embodiments of the present disclosure.
Figure 2B:
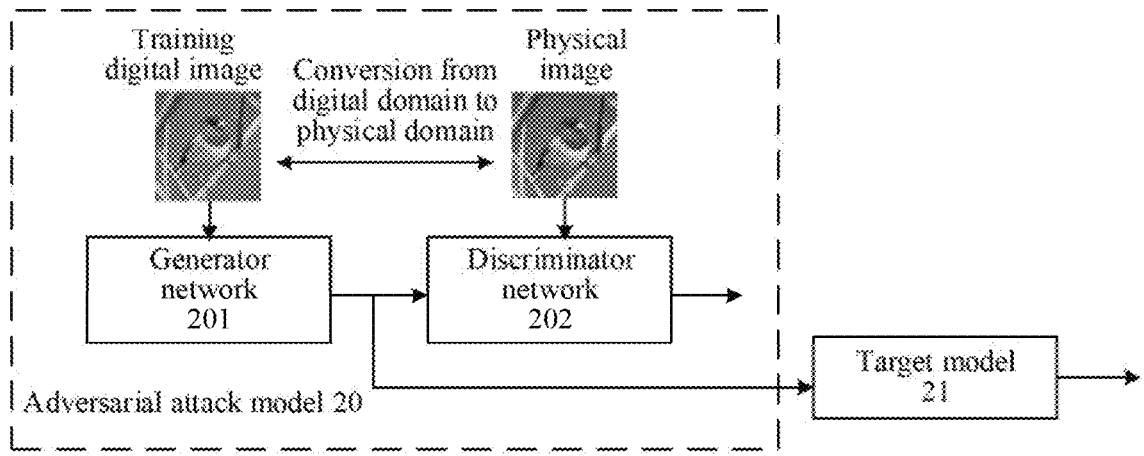
FIG. 2B shows an exemplary block diagram of an adversarial attack model according to some embodiments of the present disclosure.

FIG. 2A shows an example of an adversarial attack model 20 according to some embodiments of the present disclosure. FIG. 2B shows an example of an adversarial attack model 20 including a certain digital image sample.

Referring to FIG. 2A, the adversarial attack model 20 may include a generator network 201 and a discriminator network 202. In some embodiments, the adversarial attack model 20 is trained using a training sample. In an embodiment of the present disclosure, the training sample may be a digital image sample, referred to as a training digital image.

In some embodiments, the generator network 201 and the discriminator network 202 may include various types of machine learning models. Machine-learned models can include linear models and non-linear models. For example, machine-learned models can include regression models, support vector machines, decision tree-based models, Bayesian models, and/or neural networks (e.g., deep neural networks). For example, neural networks can include feed-forward neural networks, recurrent neural networks (e.g., long short-term memory recurrent neural networks), convolutional neural networks or other forms of neural networks.

Herein, the generator network and the discriminator network are called "network" for ease of description. However, the generator network and the discriminator network are not limited to the neural networks, but may also include other forms of machine learning models. In some embodiments, the generator network 201 and the discriminator network 202 constitute a generative adversarial network (GAN).

In some embodiments, the generator network 201 may generate an adversarial attack image based on the training digital image, and the generated adversarial attack image may be outputted to the discriminator network 202 and a target model 21. In an embodiment of the present disclosure, the target model 21 may refer to a model to be subjected to an adversarial attack.

In some embodiments, the discriminator network 202 may generate a discrimination result based on a physical image and the adversarial attack image generated by the generator network 201.

In an embodiment of the present disclosure, the physical image may be obtained by performing a conversion from a physical domain to a digital domain on the training digital image. For example, FIG. 2B shows an exemplary form of a conversion from a training digital image to a physical image. The performing the conversion from the physical domain to the digital domain on the training digital image may include one of the following: printing and scanning the training digital image, to obtain the physical image; or printing and photographing the training digital image, to obtain the physical image. For example, the training digital image may be printed by a printer, and the printed image is scanned by a scanner, to obtain the physical image. Alternatively, the training digital image may be printed by a printer, and the printed image is photographed by a camera, to obtain the physical image. In addition, the training digital image may be mapped to the physical domain at a ratio of 1:1.

In some embodiments, in a case of performing the adversarial attack on the target model 21, the adversarial attack image generated by the generator network 201 needs to deceive the target model 21. Therefore, a first target function used to train the generator network 201 may be expressed as:

$$\min_G \mathcal{L}_{adv}(f(G(x), y)) \quad (1)$$

In the first target function, $\mathcal{L}_{adv}(\bullet)$ represents an adversarial attack loss of the adversarial attack on the target model 21, $f(\bullet)$ represents the target model 21, $G(\bullet)$ represents the generator network 201, x represents the inputted training digital image, and y represents a target label set relative to a label of the training digital image. For example, the adversarial attack loss $\mathcal{L}_{adv}(\bullet)$ may be obtained with reference to the GAN model. However, the present disclosure is not limited to this adversarial attack loss, and may use other types of adversarial attack losses.

In addition, in these embodiments, the adversarial attack image generated by the generator network 201 needs to be close enough to the physical image with no noise, so as to deceive the discriminator network 202. For example, the discriminator network 202 is deceived with a requirement of the GAN. Therefore, a second target function used to train the discriminator network 202 may be expressed as:

$$\min_G \max_D \mathcal{L}_{x\text{-}GAN}(x, x_P; G, D) \quad (2)$$

In the second target function, $\mathcal{L}_{x\text{-}GAN}(\bullet)$ represents a discrimination loss of the discriminator network, $G(\bullet)$ represents the generator network, $D(\bullet)$ represents the discriminator network, x represents the training digital image inputted to the generator network, $x_p$ represents the physical image inputted to the discriminator network, and $$\min_G \max_D$$

function may represent that the discrimination loss needs to be maximized in a case of updating D, while the discrimination loss needs to be minimized in a case of updating G. For example, the discrimination loss $\mathcal{L}_{x\text{-}GAN}(\bullet)$ may be obtained with reference to the GAN model. However, the present disclosure is not limited to this discrimination loss, and may use other types of discrimination losses.

Therefore, in these embodiments, the adversarial attack model 20 may be trained based on the adversarial attack loss and the discrimination loss, to obtain variables of the generator network 201 and the discriminator network 202.

In the embodiments of the present disclosure, by using the structure of the generator network and the discriminator network to supervise a noise intensity of the generated adversarial attack image, an adversarial image generated by the trained adversarial attack model may have an improved image quality, so that the adversarial image may be used for an effective attack or for an effective training of the target model.

For ease of description, in the embodiments of the present disclosure, an image generated by the generator network during the training of the adversarial attack model is referred to as the "adversarial attack image", and an image generated by the trained adversarial attack model is referred to as the "adversarial image".

In the foregoing adversarial attack model 20, the discriminator network is able to limit an influence of noise on the physical image. In addition, the adversarial attack model 20 may be jointly optimized through the conversion process from the digital image to the physical image and the generating process of the adversarial attack image.

In addition, in some embodiments, the adversarial attack model 20 may be used in a universal physical attack. In this case, the training digital image may include a plurality of different digital images obtained by randomly cropping an original image. A corresponding plurality of physical images may be obtained by performing the conversion from the physical domain to the digital domain on the plurality of different digital images. The plurality of digital images and the plurality of physical images form a plurality of sets of digital images and physical images. Each set in the plurality of sets of digital images and physical images is used as an input of the adversarial attack model 20 for the training, the digital image in each set being used as the training digital image, and the physical image in each set being used as the physical image corresponding to the training digital image.

After the training, the adversarial attack model 20 may be used to attack other different input images. In this case, the adversarial attack model may learn an adversarial noise mode which has been more widely used.

Figure 3A:
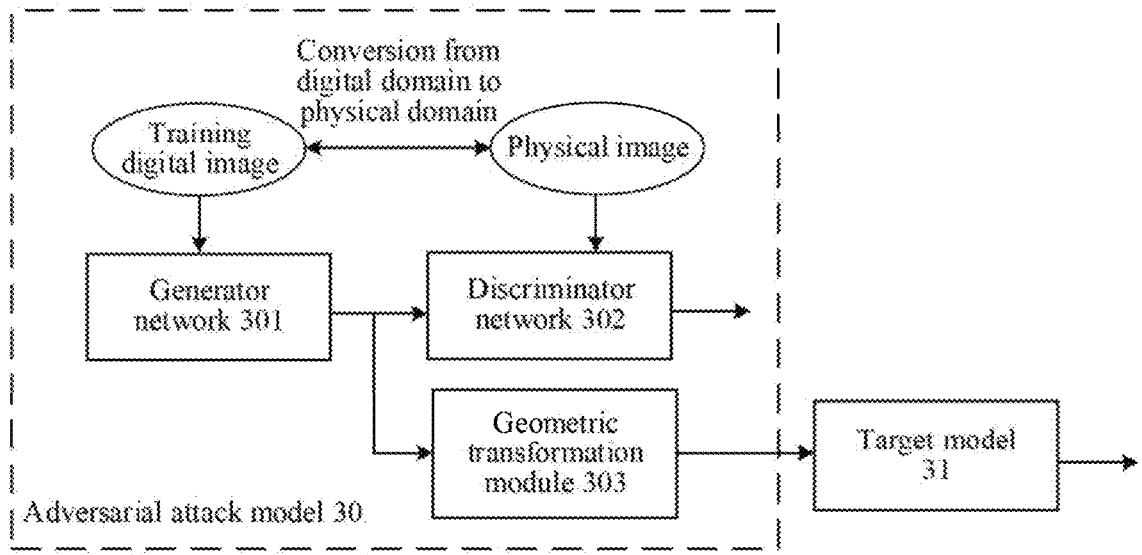
FIG. 3A shows an exemplary block diagram of an adversarial attack model according to some embodiments of the present disclosure.
Figure 3B:
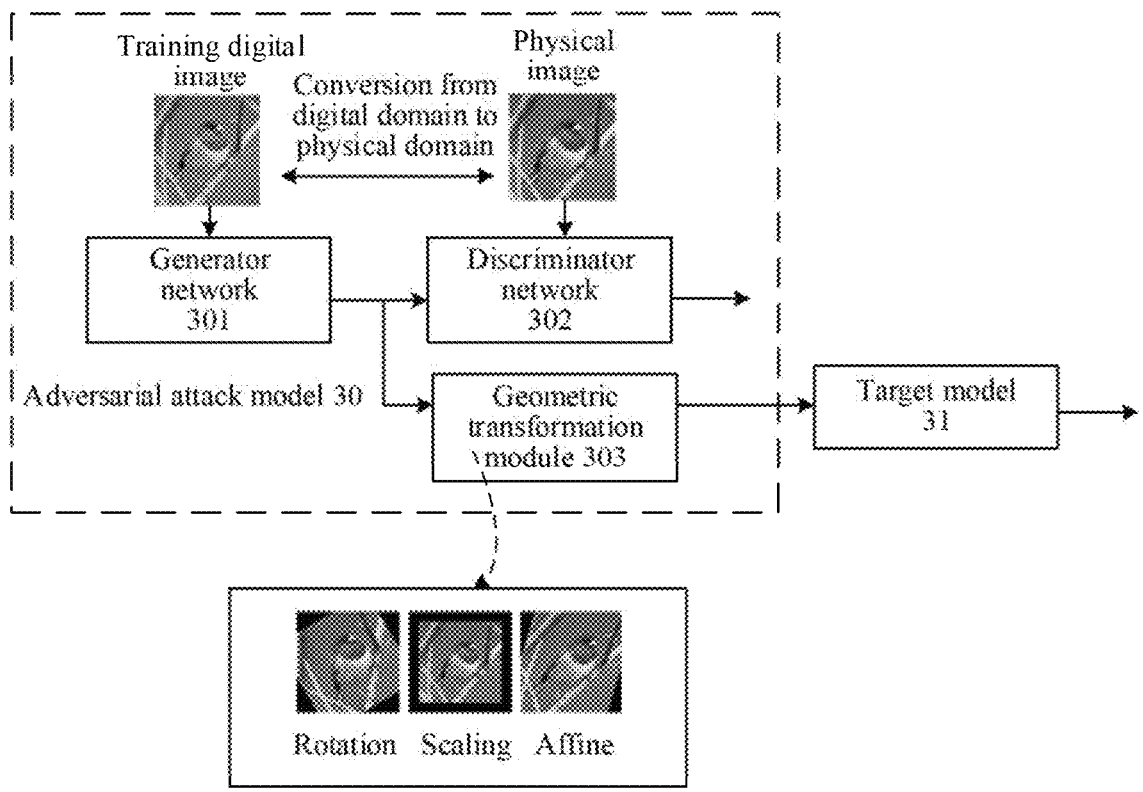
FIG. 3B shows an exemplary block diagram of an adversarial attack model according to some embodiments of the present disclosure.

FIG. 3A shows an example of an adversarial attack model 30 according to exemplary embodiments of the present disclosure. FIG. 3B shows an example of an adversarial attack model 30 including a certain digital image sample.

Referring to FIG. 3A, the adversarial attack model 30 may include a generator network 301, a discriminator network 302, and a geometric transformation module 303. Of course, it should be understood that one or more of the modules described in any of the exemplary embodiments of this disclosure can be implemented by hardware, such as processing circuitry, for example.

Implementations of the generator network 301 and the discriminator network 302 may refer to those of the generator network 201 and the discriminator network 202 as shown in FIG. 2A and FIG. 2B, which are not detailed herein. In some embodiments, the generator network 301 may generate an adversarial attack image based on a training digital image, and the generated adversarial attack image may be outputted to the discriminator network 302 and the geometric transformation module 303. In an embodiment of the present disclosure, a target model 31 may refer to a model to be subjected to an adversarial attack. For example, FIG. 3B shows an exemplary form of geometric transformation of an adversarial attack image.

In some embodiments, the geometric transformation module 303 may be configured to perform geometric transformation on the adversarial attack image generated by the generator network 301. The geometric transformation may include affine transformation. For example, the geometric transformation may include at least one of translation, scaling, flip, rotation, and shear. Therefore, the adversarial attack image after the geometric transformation may be used to perform the adversarial attack on the target model 31.

In some embodiments, in a case of performing the adversarial attack on the target model 31, the adversarial attack image generated by the generator network 301 needs to deceive the target model 31. In addition, for example, an EOT method may be used to perform the adversarial attack when training the adversarial attack model 30. In this case, a first target function used to train the generator network 301 may be expressed as:

$$\min_G E_{r \in R}[\mathcal{L}_{adv}(f(r(G(x))), y)] \qquad (3)$$

In the first target function, $\mathcal{L}_{adv}(\bullet)$ represents an adversarial attack loss of the adversarial attack on the target model 31, $f(\bullet)$ represents the target model, $G(\bullet)$ represents the generator network 301, x represents the inputted training digital image, and y represents a target label set relative to a label of the training digital image, $E[\bullet]$ represents an expectation, $r(\bullet)$ represents the geometric transformation, and R represents a set of the geometric transformation.

In addition, in these embodiments, the adversarial attack image generated by the generator network 301 also needs to be close enough to the physical image with no noise, so as to deceive the discriminator network 302. For example, the discriminator network 302 is deceived with a requirement of the GAN. Therefore, a second target function used to train the discriminator network 302 may be expressed as:

$$\min_G \max_D \mathcal{L}_{x\text{-}GAN}(x, x_p; G, D) \qquad (4)$$

In the second target function, $\mathcal{L}_{x\text{-}GAN}(\bullet)$ represents a discrimination loss of the discriminator network, $G(\bullet)$ represents the generator network, $D(\bullet)$ represents the discriminator network, x represents the training digital image inputted to the generator network 301, $x_p$ represents the physical image inputted to the discriminator network, and $$\min_G \max_D$$

function may represent that the discrimination loss needs to be maximized in a case of updating D, while the discrimination loss needs to be minimized in a case of updating G.

In these embodiments, by combining the first target function and the second target function, a final target function may be obtained as:

$$\min_G \max_D \{\mathcal{L}_{x\text{-}GAN}(x, x_p; G, D) + \lambda E_{r \in R}[\mathcal{L}_{adv}(f(r(G(x))), y)]\} \qquad (5)$$

In the final target function, λ is a weighting coefficient (referred to as an attack weight). For example, the attack weight may be a predefined hyperparameter. For example, the attack weight may be ranged from 5 to 20.

Therefore, in these embodiments, the adversarial attack model 30 including the generator network 301 and the discriminator network 302 may be trained based on the foregoing target functions, to obtain variables of the generator network 301 and the discriminator network 302.

In the embodiments of the present disclosure, by using the structure of the generator network and the discriminator network to supervise a noise intensity of the generated adversarial attack image, an adversarial image generated by the trained adversarial attack model may have an improved image quality, so that the adversarial image may be used for an effective attack or for an effective training of the target model.

In the foregoing adversarial attack model 30, the discriminator network is able to limit an influence of noise on the physical image, and the joint optimization may be realized through the conversion process from the digital image to the physical image and the generating process of the adversarial attack image. In addition, the adversarial attack image after the geometric transformation is used to perform the adversarial attack, which stabilizes the attack effect in the case of the geometric transformation, thereby improving robustness of the adversarial attack.

In addition, in some embodiments, the adversarial attack model 30 may be used in a universal physical attack. In this case, the training digital image may include a plurality of different digital images obtained by randomly cropping an original image. A corresponding plurality of physical images may be obtained by performing the conversion from the physical domain to the digital domain on the plurality of different digital images. The plurality of digital images and the plurality of physical images form a plurality of sets of digital images and physical images. Each set in the plurality of sets of digital images and physical images is used as an input of the adversarial attack model 30 for the training, the digital image in each set being used as the training digital image, and the physical image in each set being used as the physical image corresponding to the training digital image.

After the training, the adversarial attack model 30 may be used to attack other different input images. In this case, the adversarial attack model may learn an adversarial noise mode which has been more widely used.

The examples of the adversarial attack models according to some embodiments of the present disclosure are described above with reference to FIG. 2A to FIG. 2B and FIG. 3A to FIG. 3B. In the following, a training method of an adversarial attack model according to some embodiments of the present disclosure is described with reference to FIG. 4 and FIG. 5.

Figure 4:
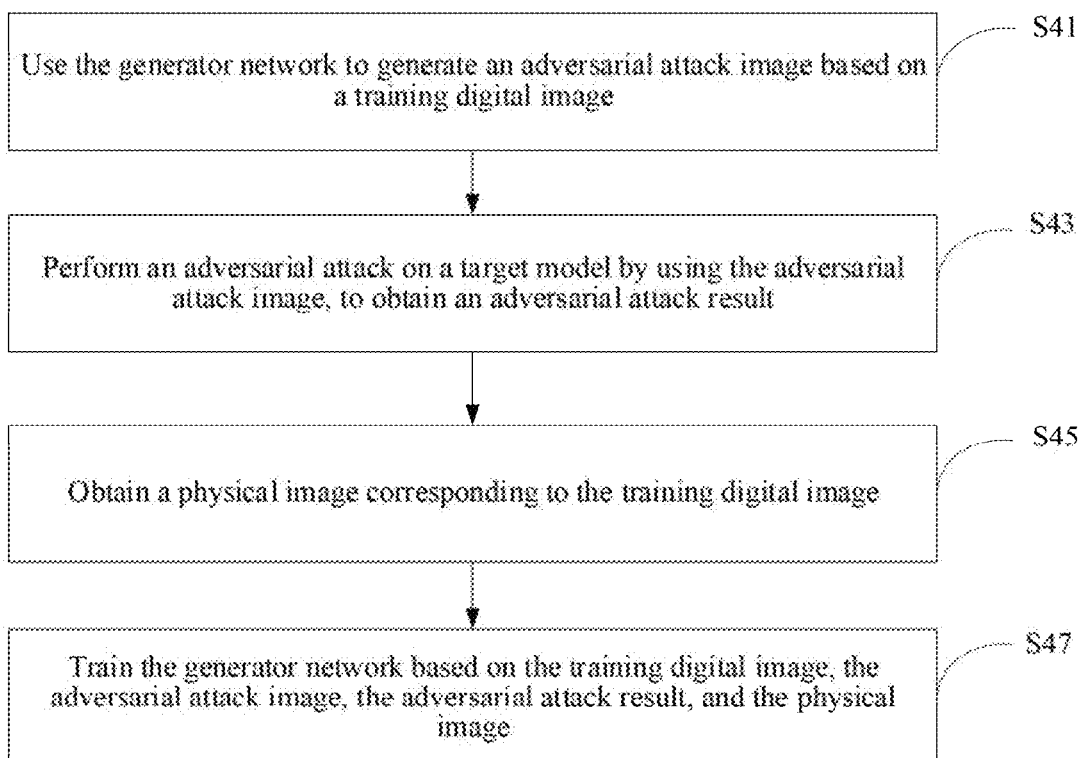
FIG. 4 shows a training method of an adversarial attack model according to some embodiments of the present disclosure, the adversarial attack model including a generator network and a discriminator network.

FIG. 4 shows a training method 40 of an adversarial attack model according to some embodiments of the present disclosure. The adversarial attack model includes a generator network and a discriminator network. For example, the method may be used to train the adversarial attack model 20 as shown in FIG. 2A or FIG. 2B.

Referring to FIG. 4, in step S41, the method uses the generator network to generate an adversarial attack image based on a training digital image. In some embodiments, the training digital image is inputted to the generator network, and the adversarial attack image is generated according to a machine learning model in the generator network.

In step S43, the method performs an adversarial attack on a target model by using the adversarial attack image, to obtain an adversarial attack result. For example, the adversarial attack result may be a recognition result or a classification result outputted by the target model.

In step S45, the method obtains a physical image corresponding to the training digital image. For example, the obtaining a physical image corresponding to the training digital image may include one of the following: printing and scanning (printing-scanning) the training digital image, to obtain the physical image; or, printing and photographing (printing-photographing) the training digital image, to obtain the physical image.

In some embodiments, step S45 may include directly receiving or reading the physical image corresponding to the training digital image. The physical image is determined through any of the foregoing exemplary manners. In this case, the physical image corresponding to the training digital image may be determined in advance.

Although step S45 is illustrated subsequent to step S41 and step S43 in FIG. 4 and the corresponding description, it should be understood that the present disclosure is not limited to this. For example, step S45 may be performed prior to step S41 or step S43, or performed in parallel with step S41 or step S43.

In step S47, the method can train the generator network based on the training digital image, the adversarial attack image, the adversarial attack result, and the physical image. In some embodiments, the adversarial attack model further includes a discriminator network, and step S47 may include: obtaining a target label corresponding to the training digital image; determining an adversarial attack loss based on the target label and the adversarial attack result, and training the generator network based on the adversarial attack loss; using the discriminator network to perform image discrimination based on the adversarial attack image and the physical image, to determine a discrimination loss; and jointly training the generator network and the discriminator network based on the adversarial attack loss and the discrimination loss.

In some embodiments, the jointly training the generator network and the discriminator network based on the adversarial attack loss and the discrimination loss includes: constructing a target loss by using the adversarial attack loss and the discrimination loss; and jointly training the generator network and the discriminator network based on the target loss.

The constructing a target loss by using the adversarial attack loss and the discrimination loss can include constructing a first target function according to the adversarial attack loss; constructing a second target function according to the discrimination loss; and determining a final target function according to the first target function and the second target function.

Correspondingly, the jointly training the generator network and the discriminator network based on the target loss includes: combinedly training the generator network and the discriminator network based on the final target function.

In some embodiments, as described with reference to FIG. 2A or FIG. 2B, based on the target label and the adversarial attack result, the adversarial attack loss may be determined as $\mathcal{L}_{adv}(f(G(x),y))$, $\mathcal{L}_{adv}(\cdot)$ representing the adversarial attack loss of the adversarial attack on the target model, $f(\cdot)$ representing the target model, $G(\cdot)$ representing the generator network, x representing the inputted training digital image, and y representing the target label set relative to the label of the training digital image.

The discrimination loss may be determined as $\mathcal{L}_{x\text{-}GAN}(x, x_p; G, D)$, $\mathcal{L}_{x\text{-}GAN}(\cdot)$ representing the discrimination loss of the discriminator network, $G(\cdot)$ representing the generator network, $D(\cdot)$ representing the discriminator network, x representing the training digital image inputted to the generator network, and $x_p$ representing the physical image inputted to the discriminator network. Therefore, the first target function may be determined as $\min_G \mathcal{L}_{adv}(f(G(x),y))$, and the second target function may be determined as $$\min_G \max_D \mathcal{L}_{x\text{-}GAN}(x, x_p; G, D).$$

In addition, the final target function may be determined based on the first target function and the second target function. For example, the final target function may be determined as:

$$\min_G \max_D \{\mathcal{L}_{x\text{-}GAN}(x, x_p; G, D) + \lambda \mathcal{L}_{adv}(f(G(x), y))\},$$

λ being the predefined attack weight.

For example, the jointly training the generator network and the discriminator network based on the adversarial attack loss and the discrimination loss may include training the generator network and the discriminator network based on the first target function and the second target function. In some embodiments, the jointly training the generator network and the discriminator network may include simultaneously training the generator network and the discriminator network in parallel. The generator network is trained based on the first target function and the second target function, and the discriminator network is trained based on the second target function.

In some implementations, the training method of an adversarial attack model described with reference to FIG. 4 may be implemented in, for example, at least one of the user equipment 110, the server 120, the training apparatus 130, and the machine learning engine 133 as shown in FIG. 1.

Figure 5:
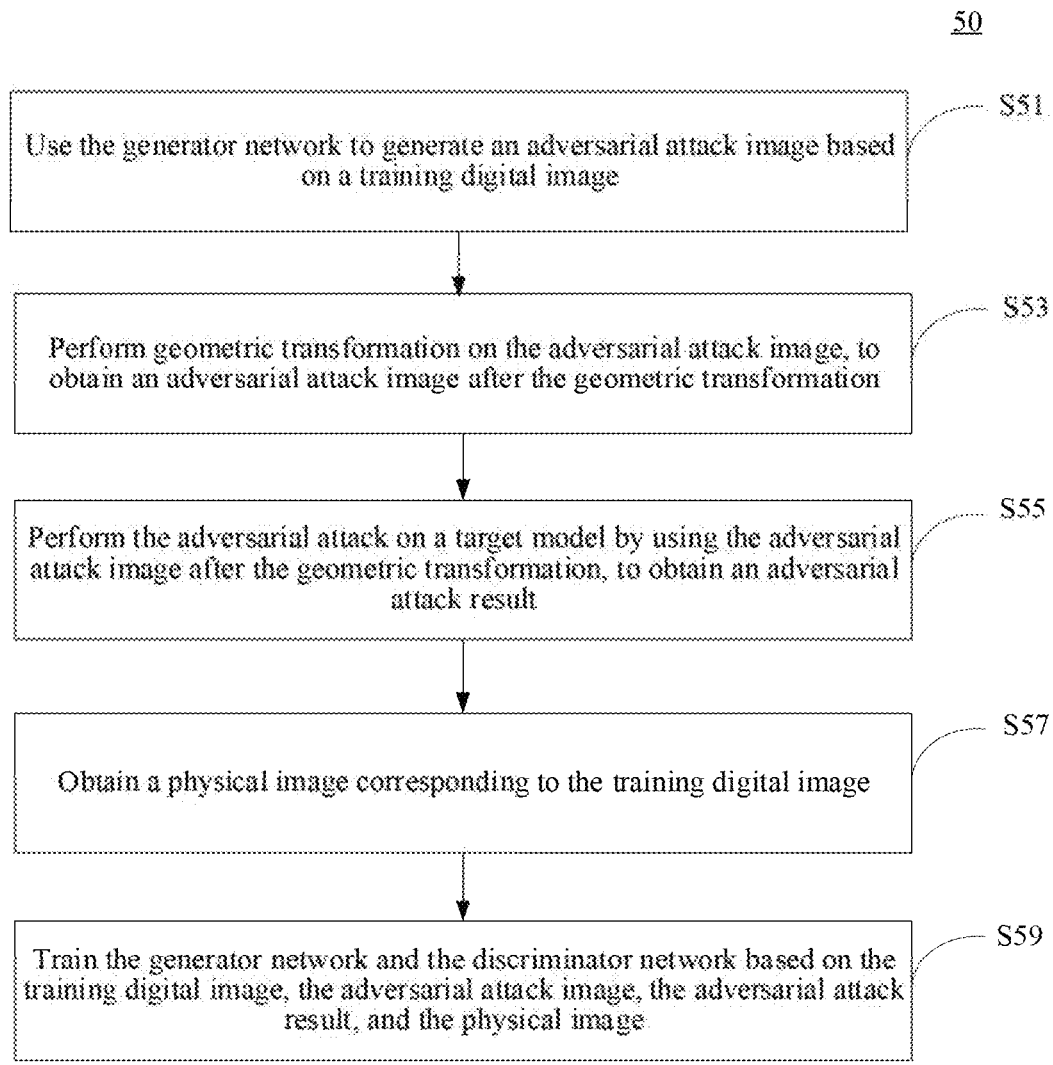
FIG. 5 shows a training method of an exemplary adversarial attack model according to some embodiments of the present disclosure, the adversarial attack model including a generator network, a discriminator network, and a geometric transformation module.

FIG. 5 shows a training method 50 of an adversarial attack model according to some embodiments of the present disclosure. The adversarial attack model includes a generator network, a discriminator network, and a geometric transformation module. For example, the method may be used to train the adversarial attack model 30 as shown in FIG. 3A or FIG. 3B.

Referring to FIG. 5, in step S51, the training method can use the generator network to generate an adversarial attack image based on a training digital image. In some embodiments, the training digital image is inputted to the generator network, to generate the adversarial attack image.

In step S53, the training method can perform geometric transformation on the adversarial attack image, to obtain an adversarial attack image after the geometric transformation. In this step, the geometric transformation module is used to perform the geometric transformation on the adversarial attack image generated by the generator network. The geometric transformation may be affine transformation. For example, the affine transformation may include at least one of translation, scaling, flip, rotation, and shear.

Therefore, the adversarial attack image after the geometric transformation may be used to perform the adversarial attack on the target model. The following describes an example of the geometric transformation. Homogeneous coordinates of a point $p(p_x,p_y)$ on the adversarial attack image are expressed as $p(p_x,p_y,1)$, and the geometric transformation is represented by a homogeneous geometric transformation matrix A. Thus, coordinates $(p_x',p_y')$ of the point $p(p_x,p_y)$ after the geometric transformation satisfy:

$$\begin{bmatrix} p_x' \\ p_y' \\ 1 \end{bmatrix} = A \cdot \begin{bmatrix} p_x \\ p_y \\ 1 \end{bmatrix} = \begin{bmatrix} a_1 & a_2 & a_3 \\ a_4 & a_5 & a_6 \\ 0 & 0 & 1 \end{bmatrix} \cdot \begin{bmatrix} p_x \\ p_y \\ 1 \end{bmatrix} \quad (6)$$

In the above formula, $a_1 \sim a_6$ are parameters of the geometric transformation, reflecting the geometric transformation, such as rotation and scaling, of the adversarial attack image. The parameters of the geometric transformation may be predefined values. For example, the parameters of the geometric transformation may be set according to different transformation requirements.

In step S55, perform the adversarial attack on a target model by using the adversarial attack image after the geometric transformation, to obtain an adversarial attack result. For example, the adversarial attack result may be a recognition result or a classification result outputted by the target model.

In step S57, the training method can obtain a physical image corresponding to the training digital image. For example, the obtaining a physical image corresponding to the training digital image may include one of the following: printing and scanning the training digital image, to obtain the physical image; or printing and photographing the training digital image to obtain the physical image.

In some embodiments, step S57 may include directly receiving or reading the physical image corresponding to the training digital image. The physical image is determined through any of the foregoing exemplary manners. In this case, the physical image corresponding to the training digital image may be determined in advance. Although step S57 is illustrated subsequent to step S51, step S53 and step S55 in FIG. 5 and the corresponding description, it should be understood that the present disclosure is not limited to this. For example, step S57 may be performed prior to any one of step S51, step S53 and step S55, or performed in parallel with any one of step S51, step S53 and step S55.

In step S59, the training method can train the generator network and the discriminator network based on the training digital image, the adversarial attack image, the adversarial attack result, and the physical image. An implementation of this step may refer to the description of step S47, which is not detailed herein.

In some embodiments, the training method of an adversarial attack model described with reference to FIG. 5 may be implemented in, for example, at least one of the user equipment 110, the server 120, and the machine learning engine 133 as shown in FIG. 1.

The adversarial attack models and the training methods thereof are described above in accordance with the exemplary embodiments of the present disclosure. In the following, a generating method of an adversarial image is described.

Figure 6:
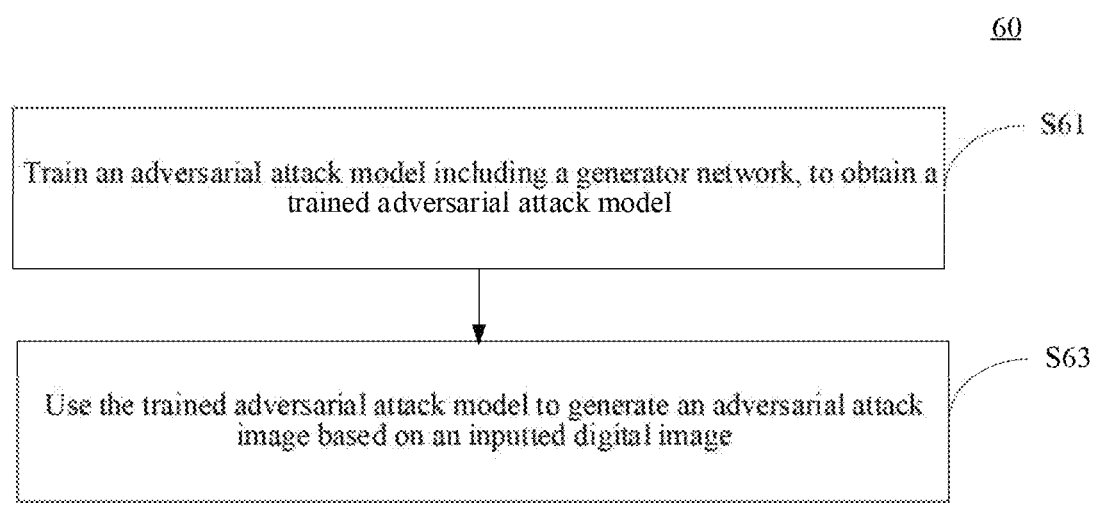
FIG. 6 shows an exemplary generating method of an adversarial image according to an embodiment of the present disclosure.

FIG. 6 shows a generating method of an adversarial image according to an embodiment of the present disclosure. For ease of description, in the embodiments of the present disclosure, an image generated by the generator network during the training of the adversarial attack model is referred to as the "adversarial attack image", and an image generated by the trained adversarial attack model is referred to as the "adversarial image".

Referring to FIG. 6, in step S61, the generating method can train an adversarial attack model including a generator network, to obtain a trained adversarial attack model.

In step S63, the generating method can use the trained adversarial attack model to generate an adversarial image based on an inputted digital image. For example, the inputted digital image may be the same as or different from a training digital image.

In some embodiments, the adversarial attack model may be the adversarial attack model 20 described with reference to FIG. 2A or FIG. 2B. In this case, step S61 may include training the adversarial attack model by using the method described with reference to FIG. 4, to obtain the trained adversarial attack model.

In some embodiments, the adversarial attack model may be the adversarial attack model 30 described with reference to FIG. 3A or FIG. 3B. In this case, step S61 may include training the adversarial attack model by using the method described with reference to FIG. 5, to obtain the trained adversarial attack model. Step S63 may include using the generator network to generate the adversarial image based on the inputted digital image. Alternatively, step S63 may include using the generator network to generate a first adversarial image based on the inputted digital image; and performing geometric transformation on the first adversarial image, to obtain a second adversarial image after the geometric transformation, and using the second adversarial image as the adversarial image.

In some embodiments, after the adversarial image is generated, the generated adversarial image may be used to perform the adversarial attack on the target model, so as to deceive the target model. Further, in some embodiments, after the adversarial image is generated, the generated adversarial image may be used to train the target model, so as to defend against an adversarial attack performed by using the adversarial image.

The generating method of an adversarial image according to the embodiments of the present disclosure is used to generate the adversarial image, so as to attack the target model, thereby determining stability of the target model. In addition, the generated adversarial image may also be used to train the target model, so as to improve capability of the target model defending against such adversarial attack.

The training method of an adversarial attack model and the generating method of an adversarial image are described above in accordance with various embodiments of the present disclosure. The flowcharts and the block diagrams in the drawings illustrate architectures, functionalities and operations of possible implementations of the methods, the apparatus, the system, and the computer-readable storage medium according to the various embodiments of the present disclosure. For example, each block in the flowcharts or the block diagrams may represent a module, segment, or portion of code that includes at least one executable instruction for implementing a specified logical function. In alternative embodiments, the functionalities described in the blocks may be performed not following the order indicated in the drawings. For example, depending upon functionalities involved, two blocks shown in succession may be executed substantially at the same time, or in a reverse order. Each block in the block diagrams and/or the flowcharts and a combination of any blocks in the block diagrams and/or the flowcharts may be implemented by a system based on dedicated hardware that performs a specified function or action or a combination of dedicated hardware and computer instructions.

Figure 7A:
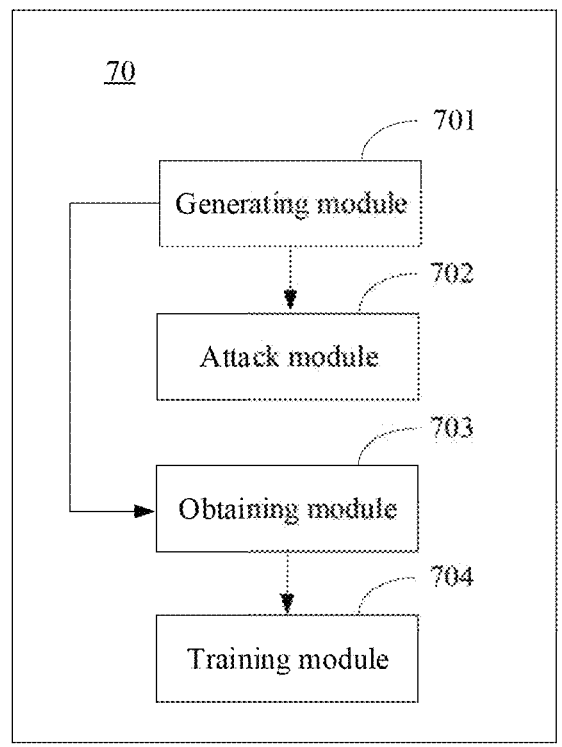
FIG. 7A shows an exemplary block diagram of a training apparatus of an adversarial attack model according to some embodiments of the present disclosure.

FIG. 7A shows an exemplary block diagram of a training apparatus 70 of an adversarial attack model according to an embodiment of the present disclosure. The adversarial attack model includes a generator network. For example, the training apparatus 70 may be used to train the foregoing adversarial attack models.

Referring to FIG. 7A, the training apparatus 70 of an adversarial attack model can include a generating module 701 that is configured to use the generator network to generate an adversarial attack image based on a training digital image, and an attack module 702 that is configured to perform an adversarial attack on a target model based on the adversarial attack image, to obtain an adversarial attack result. The training apparatus 70 can further include an obtaining module 703 that is configured to obtain a physical image corresponding to the training digital image, and a training module 704 that is configured to train the generator network based on the training digital image, the adversarial attack image, the adversarial attack result, and the physical image.

In some embodiments, the attack module 702 is configured to perform geometric transformation on the adversarial attack image to obtain an adversarial attack image after the geometric transformation; and perform the adversarial attack on the target model by using the adversarial attack image after the geometric transformation, to obtain the adversarial attack result.

In some embodiments, the adversarial attack model further includes a discriminator network. The training module 704 is configured to obtain a target label corresponding to the training digital image; determine an adversarial attack loss based on the target label and the adversarial attack result, and train the generator network based on the adversarial attack loss; use the discriminator network to perform image discrimination based on the adversarial attack image and the physical image, to determine a discrimination loss; and jointly train the generator network and the discriminator network based on the adversarial attack loss and the discrimination loss.

In some embodiments, the training apparatus 70 of an adversarial attack model may be implemented in at least one of the user equipment 110, the server 120, the training apparatus 130, and the machine learning engine 133 as shown in FIG. 1.

A specific configuration of the training apparatus 70 of an adversarial attack model may refer to the foregoing training methods of an adversarial attack model, which is not detailed herein.

Figure 7B:
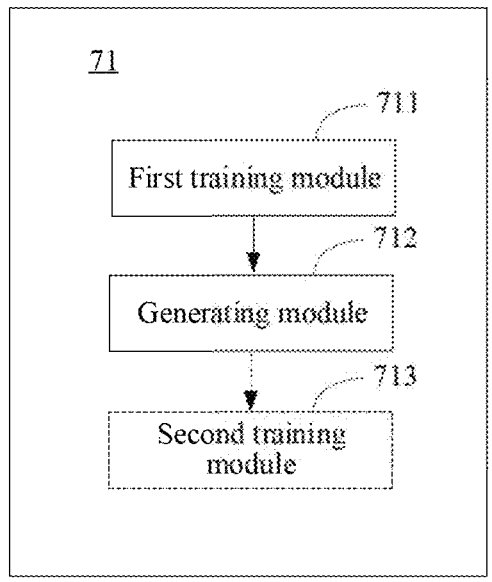
FIG. 7B shows an exemplary block diagram of a generating apparatus of an adversarial image according to some embodiments of the present disclosure.

FIG. 7B shows a generating apparatus 71 of an adversarial image according to an embodiment of the present disclosure. Referring to FIG. 7B, the generating apparatus 71 can include a first training module 711 that is configured to train an adversarial attack model including a generator network, to obtain a trained adversarial attack model, and a generating module 712 that is configured to use the trained adversarial attack model to generate the adversarial image based on an inputted digital image. The training of the adversarial attack model includes using the generator network to generate an adversarial attack image based on a training digital image; performing an adversarial attack on a target model based on the adversarial attack image, to obtain an adversarial attack result; obtaining a physical image corresponding to the training digital image; and training the generator network based on the training digital image, the adversarial attack image, the adversarial attack result, and the physical image.

In some embodiments, the apparatus 71 further can further include a second training module 713 that is configured to train the target model by using the adversarial image, to defend against an adversarial attack performed by using the adversarial image. In some embodiments, the generating apparatus 71 of an adversarial image may be implemented in at least one of the user equipment 110, the server 120, the training apparatus 130, and the machine learning engine 133 as shown in FIG. 1. A specific configuration of the generating apparatus 71 of an adversarial image may refer to the foregoing generating methods of an adversarial image, which is not detailed herein.

The following description is an experiment based on the adversarial attack model and the training method thereof according to some embodiments of the present disclosure, to illustrate effects of adversarial attacks performed by the adversarial attack model. Specifically, in the following experiment, the adversarial attack model described with reference to FIG. 3A or FIG. 3B is used and trained by using the training method described in FIG. 5. Although the adversarial attack model as shown in FIG. 3A or FIG. 3B and the training method in FIG. 5 are used in the experiment, other embodiments of the present disclosure may also be used and produce the same or similar effects.

In this experiment, the target model is a VGG-16 model pre-trained on the ImageNet. A dataset used in the experiment includes 100 digital images of different categories that have been randomly selected on the ImageNet. Each digital image is used to perform attacks respectively for two different labels. The two different labels (i.e., target labels) are respectively determined as an original label +100 and an original label −100 of the image. For example, an image with a label 14 is used to perform two attacks, whose target labels are 914 and 114 respectively. In addition, since each digital image is used for two attacks, a total of 200 attacks is performed on the target model.

This experiment trains the adversarial attack model described with reference to FIG. 3 and generates adversarial images (also referred to as adversarial samples) for adversarial attacks. In this experiment, the generator network in the adversarial attack model includes three convolutional layers, six residual blocks, and two deconvolution layers; and the discriminator network includes five convolution layers. In addition, the geometric transformation module in the adversarial attack model has a scale change range from 0.7 to 1.3, and a rotation angle range from −30° to 30°.

Further, in order to improve robustness of the adversarial attack model of the present disclosure, the geometric transformation matrix A used for the geometric transformation module is added with random noise, so as to allow the adversarial attack model to process more complex spatial transformation. The geometric transformation matrix A' after being added with the random noise may be expressed as:

$$A' = A \cdot \begin{bmatrix} b_1 & b_2 & b_3 \\ b_4 & b_5 & b_6 \\ 0 & 0 & 1 \end{bmatrix} \quad (7)$$

In the above formula, $b_i$ is a value randomly sampled in [−0.1, 0.1], and i=1, 2, ..., 6.

In addition, during the training by using the method of the present disclosure, before the geometric transformation, the adversarial attack images generated by the generator network are added with Gaussian random noise with an intensity of 0.1, to improve stability of the adversarial attack model against color changes.

The training of the adversarial attack model according to an embodiment of the present disclosure mainly includes: printing each original digital image, scanning the printed original digital image to obtain a corresponding physical image, and normalizing the physical image to 288*288 pixels; randomly cropping the original digital images and the physical images, to generate 50 sets of digital images and physical images, the digital image and the physical image in each set having 256*256 pixels and being cropped in the same manner; and using the 50 sets of digital images and physical images for the training. During the training, each time the digital image and the physical image in one set are respectively inputted to the generator network and the discriminator network in the adversarial attack model, an image generated by the generator network is subjected to transformation by the geometric transformation module, and then the image is used to attack the target model. The training is completed after 200 epochs. After the training is completed, the original digital images are inputted to the generator network, and outputs of the generator network are adversarial images that are finally used for the attacks.

In order to illustrate the effect of the method of the present disclosure, an EOT method, a RP2 method, and a D2P method are used for comparison with the method of the present disclosure. In addition, an attack success rate (ASR) is used to evaluate the attack effect. The ASR indicates a rate at which a generated adversarial image is recognized as a target category. In addition, an image noise level of an adversarial image is evaluated by users.

After performing 200 attacks on all 100 images by using the methods (the EOT method, the RP2 method, the D2P method, and the method of the present disclosure), the attack success rates and the corresponding confidences of these methods in the digital domain and the physical domain are as shown in Table 1. In addition, a project gradient descent (POD) method, which is as a digital domain attack method, is used as a reference. The other three physical domain attack methods (the EOT method, the RP2 method, and the D2P method) are also optimized by using the PGD method. For example, noise intensities used by the three physical domain attack methods (the EOT method, the RP2 method, and the D2P method) are all limited to 30 (for RGB images with intensity values ranging from 0 to 255).

In this experiment, the digital domain attack refers to using the generated adversarial samples to perform adversarial attacks, and the physical domain attack refers to using the images obtained by printing the adversarial samples and scanning the printed images to perform adversarial attacks. The attack success rates and the confidences of the method of the present disclosure in the digital domain and the physical domain are all significantly higher than those of the other methods.

TABLE 1

Attack success rates of different methods

| Attack method | Type | | | |
| --- | --- | --- | --- | --- |
| | Digital domain attack | | Physical domain attack | |
| | ASR | Confidence | ASR | Confidence |
| PGD | 0.705 | 0.559 | 0.200 | 0.129 |
| EOT | 0.970 | 0.968 | 0.480 | 0.360 |
| RP2 | 0.735 | 0.594 | 0.535 | 0.377 |
| D2P | 0.755 | 0.612 | 0.575 | 0.423 |
| Method of the present disclosure | 0.950 | 0.944 | 0.650 | 0.498 |

Table 2 shows stabilities of adversarial samples generated by different methods to geometric transformation in the physical domain. The attack effects are obtained by printing and scanning the adversarial samples, and performing scale transformation, rotation transformation and affine transformation on the adversarial samples. The result shows that the adversarial samples generated by the method of the present disclosure have the most stable attack effect, with the attack success rate (66.0%) being 11.2% higher than the highest one (54.8%) of the other methods. The average attack success rate of the adversarial samples generated by the method of the present disclosure that have been subjected to the geometric transformation processing as shown in Table 2 is higher than a success rate of the adversarial samples that have not been subjected to any transformation processing. The reason is that, in a case of generating the adversarial samples by using the method of the present disclosure, the adversarial samples have been subjected to random geometric transformation within a certain range during the training phase, so that the adversarial samples generated by the method of the present disclosure are extremely stable to the geometric transformation.

TABLE 2

Stabilities of adversarial samples generated by
different methods to geometric transformation in the physical domain

| Geometric transformation | Attack methods | | | | | | | |
|---|---|---|---|---|---|---|---|---|
| | EOT | | RP2 | | D2P | | Method of the present disclosure | |
| | ASR | Confidence | ASR | Confidence | ASR | Confidence | ASR | Confidence |
| Scaling (0) + Rotation (0°) | 0.480 | 0.360 | 0.535 | 0.377 | 0.575 | 0.423 | 0.650 | 0.498 |
| Scaling (0) + Rotation (0°) | 0.440 | 0.311 | 0.450 | 0.313 | 0.525 | 0.368 | 0.625 | 0.464 |
| Scaling (0) + Rotation (0°) | 0.470 | 0.350 | 0.515 | 0.357 | 0.550 | 0.405 | 0.700 | 0.535 |
| Scaling (0) + Rotation (0°) | 0.435 | 0.315 | 0.475 | 0.343 | 0.505 | 0.353 | 0.630 | 0.455 |
| Scaling (0) + Rotation (0°) | 0.445 | 0.327 | 0.525 | 0.367 | 0.590 | 0.416 | 0.695 | 0.523 |
| Scaling (0) + Rotation (0°) | 0.435 | 0.335 | 0.515 | 0.351 | 0.560 | 0.401 | 0.670 | 0.505 |
| Scaling (0) + Rotation (0°) | 0.440 | 0.311 | 0.460 | 0.300 | 0.520 | 0.356 | 0.645 | 0.450 |
| Scaling (0) + Rotation (0°) | 0.465 | 0.333 | 0.515 | 0.345 | 0.565 | 0.390 | 0.680 | 0.586 |
| Scaling (0) + Rotation (0°) | 0.430 | 0.302 | 0.430 | 0.298 | 0.535 | 0.352 | 0.650 | 0.418 |
| Affine [1, 0.2; 0, 1] | 0.480 | 0.347 | 0.490 | 0.383 | 0.535 | 0.352 | 0.635 | 0.450 |
| Affine [1, 0; 0.2, 1] | 0.485 | 0.352 | 0.485 | 0.360 | 0.570 | 0.426 | 0.675 | 0.506 |
| Average | 0.455 | 0.370 | 0.490 | 0.331 | 0.548 | 0.386 | 0.660 | 0.483 |

As described in the foregoing embodiments of the present disclosure, the obtaining the physical image includes printing and scanning the digital image, or printing and photographing the digital image. There are obvious differences between the images obtained by the scanning and the photographing. For example, the photographing is more susceptible to complex external conditions such as lighting, lens distortion, and the like.

Therefore, in order to test transferabilities of the adversarial samples, the manner of obtaining the physical image is changed from the printing-scanning manner to the printing-photographing manner. As shown in Table 3, in the case of obtaining the physical image in the printing-photographing manner, the attack success rate of the method of the present disclosure is more than 10% higher than those of the other comparative methods.

TABLE 3

Transferabilities of adversarial
samples generated by different methods

| | Geometric transformation | | | | | |
|---|---|---|---|---|---|---|
| | Rotation 0° | | Rotation 20° | | Rotation −20° | |
| Method | ASR | Confidence | ASR | Confidence | ASR | Confidence |
| EOT | 0.39 | 0.301 | 0.39 | 0.297 | 0.38 | 0.282 |
| RP2 | 0.41 | 0.301 | 0.43 | 0.307 | 0.40 | 0.296 |
| D2P | 0.43 | 0.321 | 0.42 | 0.307 | 0.44 | 0.314 |
| Method of the present disclosure | 0.51 | 0.362 | 0.53 | 0.352 | 0.54 | 0.366 |

In addition, the present disclosure tests influence of different attack weights $\lambda$ on the adversarial attack model. Referring to Table 4, the attack effects in the digital domain and the physical domain both increase as the attack weight $\lambda$ increases from 5 to 10. The attack success rate in the physical domain increases from 51% to 71%, indicating that a high attack weight may generate a more stable adversarial sample. However, although the attack effect is more stable, the image quality decreases to a certain extent with the increase of the attack weight $\lambda$.

TABLE 4

Influences of different attack weights
$\lambda$ on the adversarial attack model

| | Digital domain attack | | Physical domain attack | |
|---|---|---|---|---|
| $\lambda$ | ASR | Confidence | ASR | Confidence |
| 5 | 0.880 | 0.876 | 0.510 | 0.360 |
| 10 | 0.970 | 0.968 | 0.710 | 0.569 |

Figure 8A:
FIG. 8A to FIG. 8C respectively show original digital images and examples of adversarial samples generated by using an expectation over transformation (EOT) method, a robust physical perturbations (RP2) method, a digital domain to physical domain mapping (D2P) method, and a method of the present disclosure.
Figure 8A:
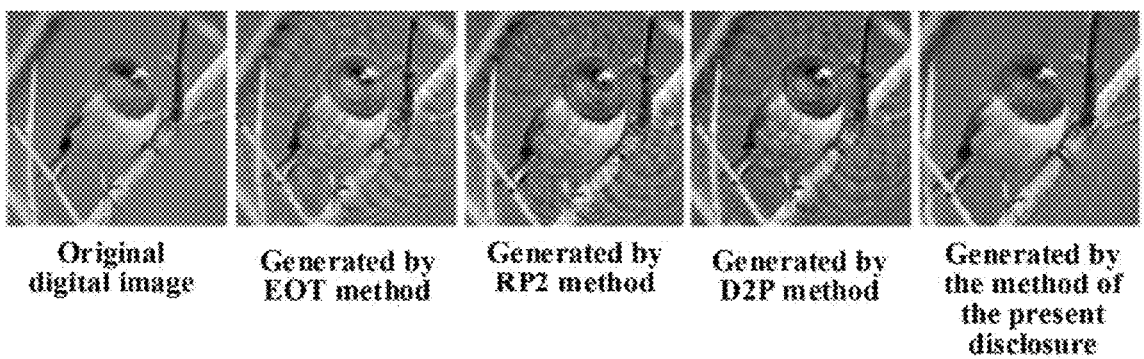
Figure 8B:
Figure 8B:
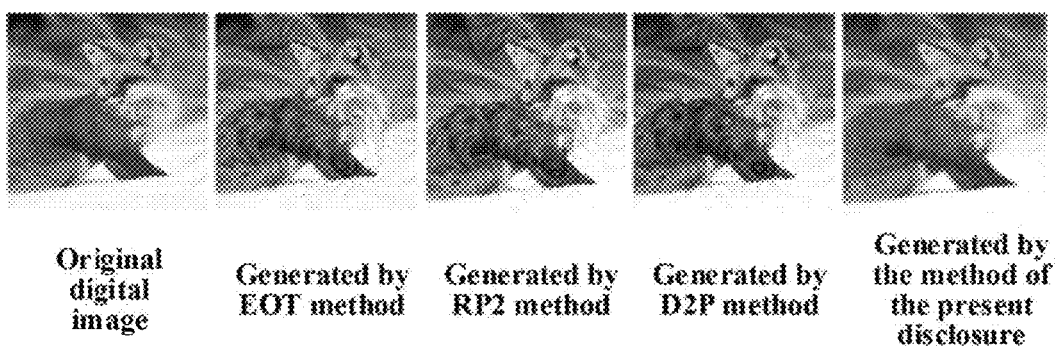
Figure 8C:
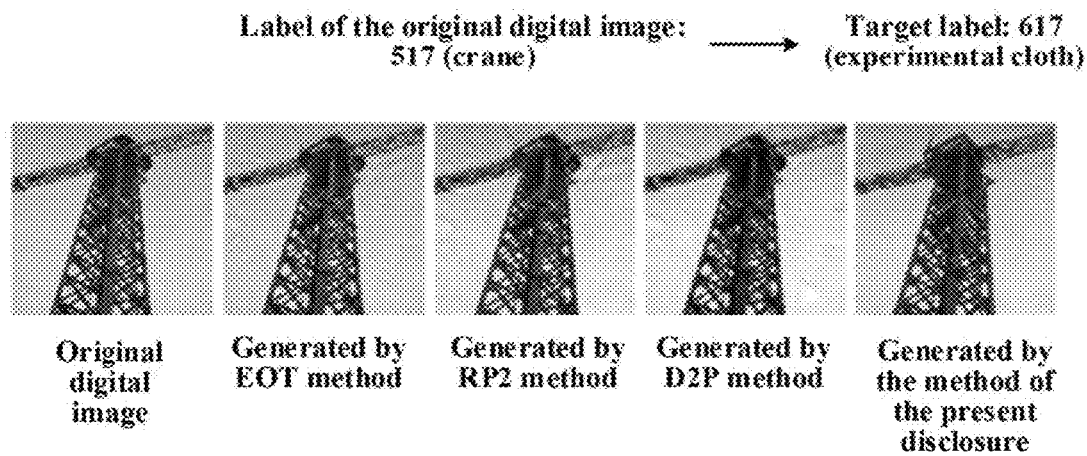

In order to measure image qualities of adversarial samples generated by different methods, users were invited to participate a test. Specifically, each user participating in the test completed 100 multiple-choice questions, each of which showed an original image and adversarial samples generated by respectively using the four methods, including the EOT method, the RP2 method, the D2P method, and the method of the present disclosure. FIG. 8A to FIG. 8C show examples of adversarial samples generated by the different methods, including the EOT method, the RP2 method, the D2P method, and the method of the present disclosure.

Referring to FIG. 8A to FIG. 8C, the original digital images and examples of the adversarial samples generated by using the EOT method, the RP2 method, the D2P method, and the method of the present disclosure are respectively illustrated. Each user selected one image that looks the most natural and exhibits the least distortion. A total of 106 users participated in the test. Since the users were not required to select an answer for each question, a total of 10237 answers were received. A distribution of final answers is shown in Table 5 and FIG. 9.

TABLE 5

Distribution of users' answers

| Method | Quantity of adversarial samples generated by the method in answers (proportion) |
|---|---|
| EOT | 1081 (10.6%) |
| RP2 | 1001 (9.8%) |
| D2P | 903 (8.8%) |
| Method of the present disclosure | 7252 (70.8%) |

Figure 9:
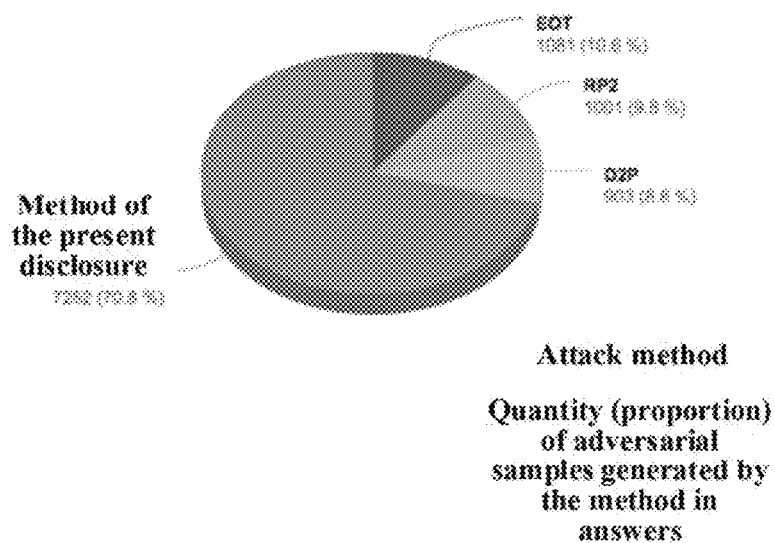
FIG. 9 shows a schematic diagram of a distribution of users' answers in a case of performing an experiment by using an EOT method, a RP2 method, a D2P method, and a method of the present disclosure.

As shown in Table 5 and FIG. 9, more than 70% of users selected the images generated by the method of the present disclosure. The result indicates that the adversarial samples generated by the method of the present disclosure have better image qualities than those generated by the other comparative methods.

Figure 10:
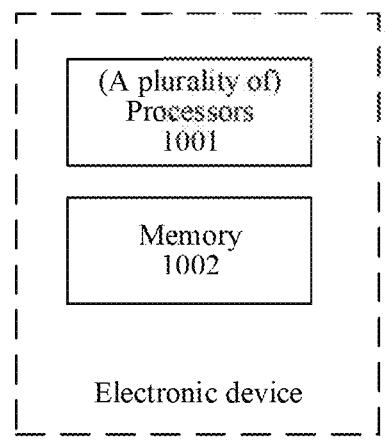
FIG. 10 shows an exemplary block diagram of an electronic device according to an embodiment of the present disclosure.

FIG. 10 shows an exemplary block diagram of an electronic device according to an embodiment of the present disclosure. Referring to FIG. 10, an electronic device 100 may include one or more processors 1001 and a memory 1002. The memory 1002 may be configured to store one or more computer programs.

The processor 1001 may include various kinds of processing circuits, including, but not limited to, one or more of a special-purpose processor, a central processing unit (CPU), an application processor, or a communications processor. The processor 1001 may perform control over at least one other component of the electronic device 100, and/or perform communication-related operations or data processing.

The memory 1002 may include a volatile memory and/or a non-volatile memory.

In some embodiments, one or more non-transitory computer programs, when executed by the one or more processors 1001, cause the one or more processors 1001 to implement the foregoing methods of the present disclosure.

In some embodiments, the electronic device 100 may be implemented in at least one of the user equipment 110, the server 120, the training apparatus 130, and the machine learning engine 133 as shown in FIG. 1. For example, the electronic device 100 in an embodiments of the present disclosure may include a smartphone, a tablet personal computer (PC), a server, a mobile phone, a video phone, an e-book reader, a desktop PC, a laptop computer, a netbook computer, a personal digital assistant (PDA), a portable media player (PMP), a MP3 player, a mobile medical device, a camera or a wearable device (e.g. a head-mounted display (HMD), an electronic cloth, an electronic wristband, an electronic necklace, an electronic accessory, an electronic tattoo, or a smartwatch), and the like.

As used herein, the term "module" may include a unit configured in hardware, software, or firmware and/or any combination thereof, and may be used interchangeably with other terms (e.g., logic, logical block, component, or circuit). A module may be a single integral component or a smallest unit or component that is configured to perform one or more functionalities. The module may be implemented mechanically or electronically, and may include, but is not limited to, a known or to-be-developed one that is configured to perform certain operations, such as a special-purpose processor, a CPU, an ASIC chip, an FPGA, or a programmable logic component.

According to an embodiment of the present disclosure, at least a portion of an apparatus (e.g., a module or a function thereof) or a method (e.g., an operation or a step) may be implemented, for example, as instructions stored in a non-transitory computer-readable storage medium (e.g., the memory 112, the memory 114, the memory 122, the memory 132, or the memory 1002) in the form of programming modules. The instructions, when executed by a processor (e.g., the processor 111, the processor 121, the processor 131, or the processor 1001), may cause the processor to perform corresponding functionalities. The computer-readable medium may include, for example, a hard disk, a floppy disk, a magnetic medium, an optical recording medium, a digital versatile disc (DVD), a magneto-optical medium. The instructions may include code created by a compiler or executable by an interpreter. The modules or the programming modules according to the embodiments of the present disclosure may include at least one or more of the foregoing components with omitting some others, or may also include other additional components. Operations performed by the modules, the programming modules, or other components according to the embodiments of the present disclosure may be performed sequentially, parallelly, repeatedly or heuristically. Alternatively, at least some of the operations may be performed in a different order or may be omitted. Alternatively, additional operations may be added.

The above are merely exemplary embodiments of the present disclosure and are not intended to limit the protection scope of the present disclosure.

What is claimed is:

1. A training method of an adversarial attack model including a generator network and a discriminator network, the training method comprising:
   using the generator network to generate an adversarial attack image based on a training digital image;
   performing, by processing circuitry, an adversarial attack on a target model by applying a geometric transformation to the adversarial attack image and inputting the transformed image to the target model to obtain an adversarial attack result;
   obtaining a physical image by printing the training digital image on a physical medium and capturing the physical image of the training digital image printed on the physical medium;
   using the discriminator network to perform image discrimination between (i) the adversarial attack image generated from the training digital image and (ii) the physical image captured from a physical representation of the training digital image to determine a discrimination loss; and
   training the generator network and the discriminator network to minimize a combined loss function including an adversarial attack loss based on the adversarial attack result and the discrimination loss.

2. The training method according to claim 1, wherein the training the generator network further includes:
   obtaining a target label corresponding to the training digital image;
   determining an adversarial attack loss based on the target label and the adversarial attack result, and training the generator network based on the adversarial attack loss; and jointly training the generator network and the discriminator network based on the adversarial attack loss and the discrimination loss.

3. The training method according to claim 2, wherein the jointly training the generator network and the discriminator network further comprises:
using the adversarial attack loss and the discrimination loss to construct a target loss; and
jointly training the generator network and the discriminator network based on the target loss.

4. The training method according to claim 3, wherein the using the adversarial attack loss and the discrimination loss to construct the target loss further comprises:
constructing a first target function based on the adversarial attack loss;
constructing a second target function based on the discrimination loss; and
determining a final target function based on the first target function and the second target function,
wherein the jointly training the generator network and the discriminator network based on the target loss further includes training both the generator network and the discriminator network based on the final target function.

5. The training method according to claim 2, wherein the jointly training the generator network and the discriminator network further comprises:
constructing a first target function based on the adversarial attack loss;
constructing a second target function based on the discrimination loss;
training the generator network based on the first target function and the second target function; and
training the discriminator network based on the second target function.

6. The training method according to claim 1, wherein the geometric transformation comprises at least one of translation, scaling, flip, rotation, and shear.

7. The training method according to claim 1, wherein the obtaining the physical image corresponding to the training digital image further comprises:
printing and scanning the training digital image to obtain the physical image.

8. The training method according to claim 1, wherein the obtaining the physical image corresponding to the training digital image further comprises:
printing and photographing the training digital image to obtain the physical image.

9. A generating method of an adversarial image, comprising:
training, by processing circuitry, the adversarial attack model including the generator network to obtain a trained adversarial attack model; and
using, by processing circuitry, the trained adversarial attack model to generate the adversarial image based on an inputted digital image,
wherein the adversarial attack model is trained according to the training method of claim 1.

10. The generating method according to claim 9, further comprising:
training the target model by using the adversarial image to defend against the adversarial attack performed by using the adversarial image.

11. An electronic device, comprising:
a processor; and
a memory that stores one or more computer programs that, when executed by a processor, cause the processor to perform the generating method of the adversarial image according to claim 9.

12. A non-transitory computer-readable storage medium that stores a computer programs that, when executed by a processor, causes the processor to perform the generating method of the adversarial image according to claim 9.

13. An electronic device, comprising:
a processor; and
a memory that stores a non-transitory computer-readable instruction that, when executed by the processor, causes the processor to perform the training method of the adversarial attack model according to claim 1.

14. A non-transitory computer-readable storage medium that stores a computer program that, when executed by a processor, causes the processor to perform the training method of the adversarial attack model according to claim 1.

15. A training apparatus of an adversarial attack model that includes a generator network and a discriminator network, the training apparatus comprising:
processing circuitry configured to:
use the generator network to generate an adversarial attack image based on a training digital image;
perform an adversarial attack on a target model by applying a geometric transformation to the adversarial attack image and inputting the transformed image to the target model to obtain an adversarial attack result;
obtain a physical image by printing the training digital image on a physical medium and capturing the physical image of the training digital image printed on the physical medium;
use the discriminator network to perform image discrimination between (i) the adversarial attack image generated from the training digital image and (ii) the physical image captured from a physical representation of the training digital image to determine a discrimination loss; and
train the generator network and the discriminator network to minimize a combined loss function including an adversarial attack loss based on the adversarial attack result and the discrimination loss.

16. The training apparatus according to claim 15, wherein the processing circuitry is configured to:
obtain a target label corresponding to the training digital image;
determine an adversarial attack loss based on the target label and the adversarial attack result, and train the generator network based on the adversarial attack loss; and
jointly train the generator network and the discriminator network based on the adversarial attack loss and the discrimination loss.

17. A generating apparatus of an adversarial image comprising processing circuitry that is configured to:
train an adversarial attack model including a generator network and a discriminator network to obtain a trained adversarial attack model; and
use the trained adversarial attack model to generate the adversarial image based on an inputted digital image,
wherein training the adversarial attack model includes using the generator network to generate an adversarial attack image based on a training digital image; performing an adversarial attack on a target model by applying a geometric transformation to based on the adversarial attack image and inputting the transformed image to the target model to obtain an adversarial attack result; obtaining a physical image by printing the training digital image on a physical medium and capturing the physical image of the training digital image printed on the physical medium; using the discriminator network to perform image discrimination between (i) the adversarial attack image generated from the training digital image and (ii) the physical image captured from a physical representation of the training digital image to determine a discrimination loss; and training the generator network and the discriminator network to minimize a combined loss function including an adversarial attack loss based on the adversarial attack result and the discrimination loss.

18. The generating apparatus according to claim 17, wherein the processing circuitry is further configured to train the target model by using the adversarial image to defend against an adversarial attack performed by using the adversarial image.

* * * * *